(12) United States Patent
Ciccone

(10) Patent No.: US 7,186,112 B2
(45) Date of Patent: Mar. 6, 2007

(54) INJECTION MOLD FOR FORMING CRIMP-ON POUR SPOUTS

(75) Inventor: Vince Ciccone, Kleinburg (CA)

(73) Assignee: Injectnotech Inc., Mississauga (CA)

( * ) Notice: Subject to any disclaimer, the term of this patent is extended or adjusted under 35 U.S.C. 154(b) by 278 days.

(21) Appl. No.: 10/857,721

(22) Filed: May 28, 2004

(65) Prior Publication Data

US 2005/0266115 A1    Dec. 1, 2005

(51) Int. Cl.
*B29C 45/40* (2006.01)

(52) U.S. Cl. .................. 425/556; 425/443; 425/577

(58) Field of Classification Search ............. 425/443, 425/577, 556, DIG. 58
See application file for complete search history.

(56) References Cited

U.S. PATENT DOCUMENTS

| | | | | |
|---|---|---|---|---|
| 3,534,443 A | * | 10/1970 | Tucker | 425/443 |
| 4,533,312 A | * | 8/1985 | Von Holdt | 425/438 |
| 4,653,997 A | * | 3/1987 | Sheffield et al. | 425/556 |
| 4,695,421 A | * | 9/1987 | Takeda | 264/318 |
| 5,518,679 A | * | 5/1996 | Junk | 264/318 |
| 6,390,800 B1 | * | 5/2002 | Brown et al. | 425/436 R |
| 6,506,330 B1 | * | 1/2003 | Schweigert et al. | 264/318 |

* cited by examiner

*Primary Examiner*—Joseph S. Del Sole
*Assistant Examiner*—Emmanuel S. Luk
(74) *Attorney, Agent, or Firm*—Lipsitz & McAllister, LLC

(57) ABSTRACT

An injection mold has first, second and third mold parts. The first mold part defines a void having a front end, a rear end and a central axis. The second mold part includes a plug portion and a protuberant portion. The third mold part has a molding position frontwardly adjacent the first mold part and is frontwardly movable relative to the first mold part to a respective release position. The three mold parts have a molding configuration corresponding to molding positions of the second mold part and the third mold part. The mold parts define a mold cavity for an article having a main body, tubular spout, and annular rim portions. The first, second and third mold parts also have a release configuration corresponding to the release positions of the second and third mold parts, permitting the removal of a molded article from the mold.

18 Claims, 17 Drawing Sheets

INJECTION MOLD FOR FORMING CRIMP-ON POUR SPOUTS

FIELD OF THE INVENTION

The present invention relates to injection molding, and more particularly, to an injection mold for forming a molded article having a crimp-on pour spout.

BACKGROUND OF THE INVENTION

Injection molding is commonly used to produce containers. One popular container produced in large quantities by such method is the five gallon pail (not shown). Commonly, the pail is provided with a peripheral flange which circumscribes the open upper end of the pail and extends therefrom outwardly or radially (not shown).

Lids are often also produced. One prior art lid 20 is shown in cross section in FIG. 1. This lid 20 has a main body portion 22, a depending annular peripheral skirt 24 and an inwardly disposed locking flange 26 which circumscribes the interior of the skirt 24. This permits the lid 20 to be snap-fit over the open end of a pail, such that the locking flange 26 mechanically engages the underside of the peripheral flange thereof (not shown). To facilitate pouring, in situations wherein the lid 20 is used with liquids or other pourable material, its main body portion 22 has a central planar portion 28 and a tubular spout portion 30. The central planar portion 28 defines an aperture 32. The spout portion 30 has one end 34 in communication with the aperture 32 and extends therefrom, in a direction opposite to the direction in which the skirt 24 depends, to a distal end 36. To facilitate sealing, it is common to provide the main body portion 22 with a rim portion 38 which circumscribes the distal end 36 of the spout portion 30 and radially projects therefrom, and to provide a cap (not shown) which can be crimped around the distal end 36 to mechanically engage the underside of the rim portion 38. For reasons evident from the foregoing, the aforedescribed type of lid is known in the industry as one having a "crimp-on pour spout".

A number of known systems are used to mold lids having crimp-on pour spouts.

One known system is illustrated in FIGS. 2,2A. This system includes a core mold 40 which forms the underside of the lid and the inner surface of the pour spout, a stripper ring 42 which forms the lower edge of the skirt, and a cavity mold 44 which forms the top surface of the lid. In operation, after a lid has been molded, the cavity mold 44 separates from the core mold 40 and stripper ring 42, leaving the lid in place, and thereafter, the stripper ring 42 separates from the core mold 40, to eject the lid 20, as shown in FIG. 2A. This system is known to be capable of the economic production of lids, but suffers from being relatively noisy during mold use, and also results in distortion of the spout and other high-stress areas during separation.

Another known system is shown in FIGS. 3A,3B,4A,4B. This system includes a core mold 40' which forms the underside of the lid and the inner surface of the pour spout, a stripper ring 42' which forms the edge of the skirt, and a cavity mold 44' which forms the top surface of the lid. A ring of collets 46 form part of the cavity mold 44'. In operation, after a lid has been molded, the cavity mold 44' separates from the core mold 40' and stripper ring 42', leaving the lid. During such process, the collets 46 move out and away from another. The stripper ring 42' thereafter separates from the core mold 40', to eject the lid, as shown in FIG. 4B. This system is known to be capable of producing molded parts of good quality. However, the system, being relatively mechanically complex, can suffer from relatively high expense. Further, the edges where the collets meet can leave witness lines on the molded part. As well, unless the collets are provided with cooling, which adds yet further complexity and cost, the cycle time can be relatively slow (which itself has an associated cost) and the molded parts can suffer from excessive distortion.

SUMMARY OF THE INVENTION

The present invention permits the relatively inexpensive production of relatively high quality molded articles having crimp-on pour spouts.

According to one aspect of the invention, an injection mold, comprising a first mold part, a second mold part and a third mold part, is provided.

The first mold part defines a void having a front end, a rear end and a central axis extending therebetween. The void includes a part-forming portion and, rearwardly disposed therefrom, a socket portion.

The second mold part includes a plug portion and a protuberant portion. The second mold part has a molding position whereat the plug portion is seated in the socket portion and the protuberant portion is disposed in the part-forming portion, and is rearwardly movable therefrom relative to the first mold part to a respective release position whereat the protuberant portion is disposed rearwardly from the part-forming portion.

The third mold part has a molding position frontwardly adjacent the first mold part and is frontwardly movable therefrom relative to the first mold part to a respective release position.

The first mold part, the second mold part and the third mold part have a molding configuration corresponding to the molding positions of the second mold part and the third mold part and in which the first mold part, the second mold part and the third mold part collectively define a mold cavity for an article.

The article has a main body portion, a tubular spout portion and an annular rim portion. The main body portion defines an aperture. The spout portion has one end in communication with the aperture and rearwardly extends therefrom to a distal end. The rim portion rings the distal end of the spout portion.

The first mold part, the second mold part and the third mold part also have a release configuration corresponding to the release positions of the second mold part and the third mold part and which permits the removal of a molded article from the mold.

According to another aspect of the invention, an injection mold is provided. The injection mold is for molding an article having a main body portion, a tubular spout portion and an annular rim portion. The main body portion defines an aperture. The spout portion has one end communicating with the aperture and extends therefrom to a distal end. The rim portion rings the distal end of the spout portion.

The mold comprises a first mold part, a second mold part and a third mold part. The first mold part defines a void having a front end, a rear end and a central axis extending therebetween. The second mold part has a molding position whereat it is seated in the void and is rearwardly movable therefrom relative to the first mold part to a respective release position. The third mold part has a molding position frontwardly adjacent the first mold part and is frontwardly movable therefrom relative to the first mold part to a respective release position.

The first mold part, the second mold part and the third mold part have a molding configuration corresponding to the molding positions of the second mold part and the third mold part and in which the first mold part, the second mold part and the third mold part collectively define a mold cavity for said article.

The first mold part, the second mold part and the third mold part also have a release configuration corresponding to the release positions of the second mold part and the third mold part, in which configuration the mold permits the removal of a molded article.

The mold cavity is orientated such that, in a molded article produced therein in use, the spout projects rearwardly. The second mold part defines the inner surface of the spout portion.

Injection molding processes also form part of the invention.

Advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinafter.

BRIEF DESCRIPTION OF THE DRAWINGS

In the drawings, wherein like parts are provided with identical indicia, and which are for purposes of illustration, only.

DETAILED DESCRIPTION

Figure 1:
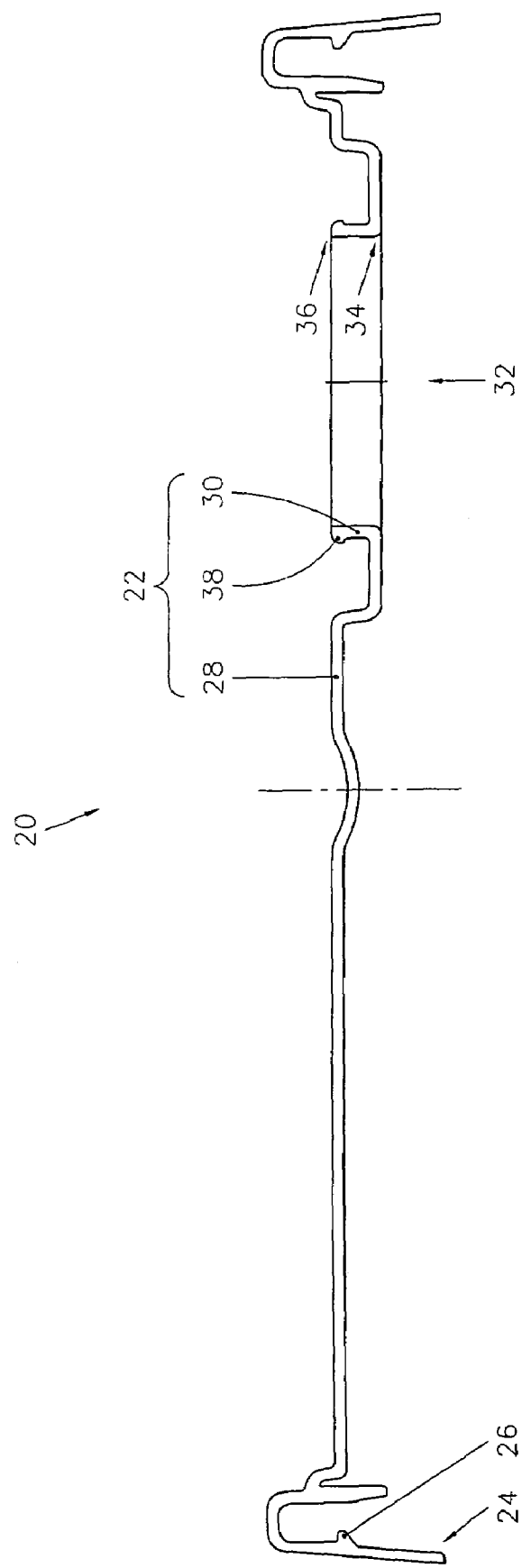
FIG. 1 is a cross section view along a vertical plane through the centre of a lid of the prior art.
Figure 2A:
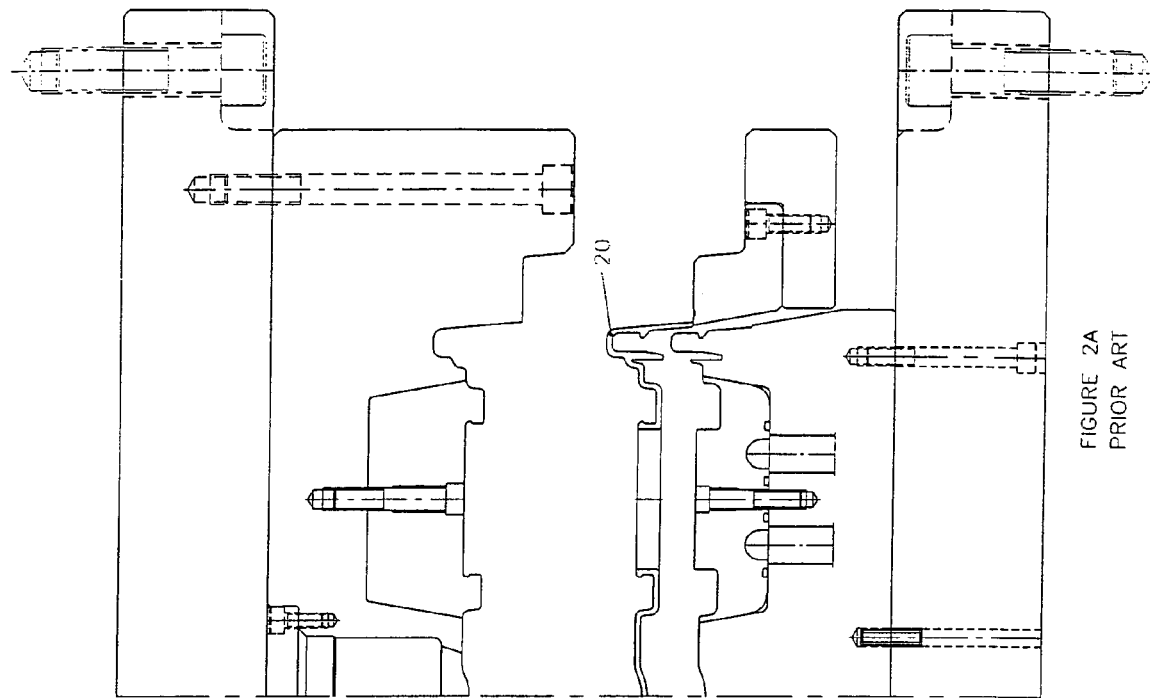
FIG. 2A is a view similar to FIG. 2, shown with the mold open.
Figure 2:
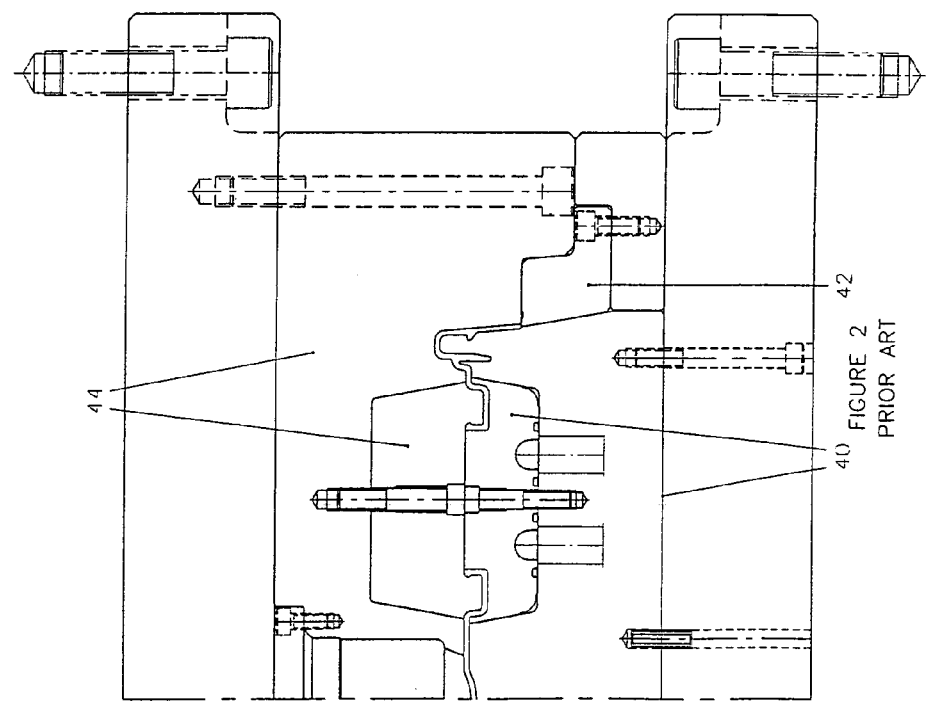
FIG. 2 is a half cross section view along a vertical plane through the centre of a mold of the prior art, shown with the mold closed.
Figure 3A:
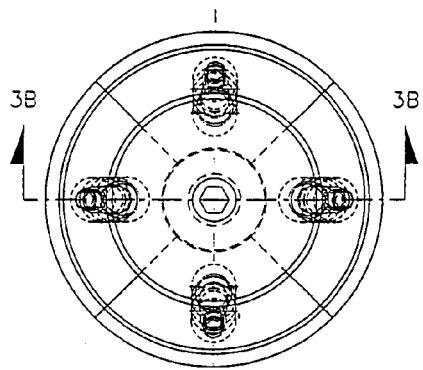
FIG. 3A is a top view of a further mold of the prior art, shown with the mold closed.
Figure 4A:
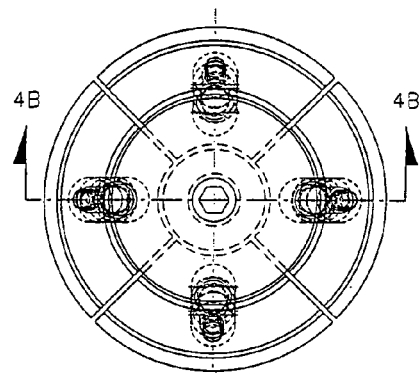
FIG. 4A is a top view of the mold of FIG. 3A, shown with the mold open.
Figure 3B:
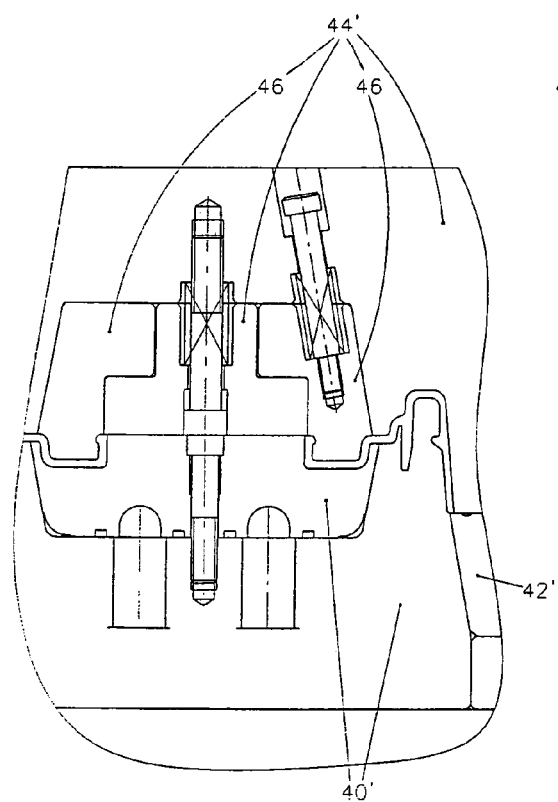
FIG. 3B is a view along section line 3B—3B of FIG. 3A.
Figure 4B:
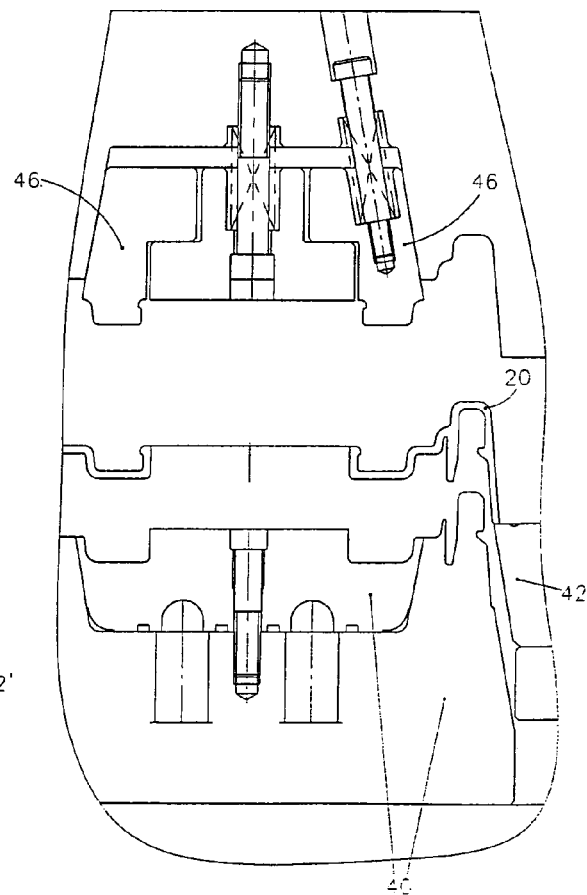
FIG. 4B is a view along section line 4B—4B of FIG. 4A.

With general reference to FIGS. 5–9, a first preferred embodiment of the present invention, an injection mold, is illustrated, and is designated by general reference numeral 50. Although not shown, it will be readily understood by persons of ordinary skill in the art upon a review of the following description that this mold 50 is for use with a conventional injection molding machine of the type having a pair of platens movable with respect to one another (not shown), and is for molding the lid shown in FIG. 1.

The injection mold 50 comprises a first mold part 52, a second mold part 54 and a third mold part 56.

Figure 5:
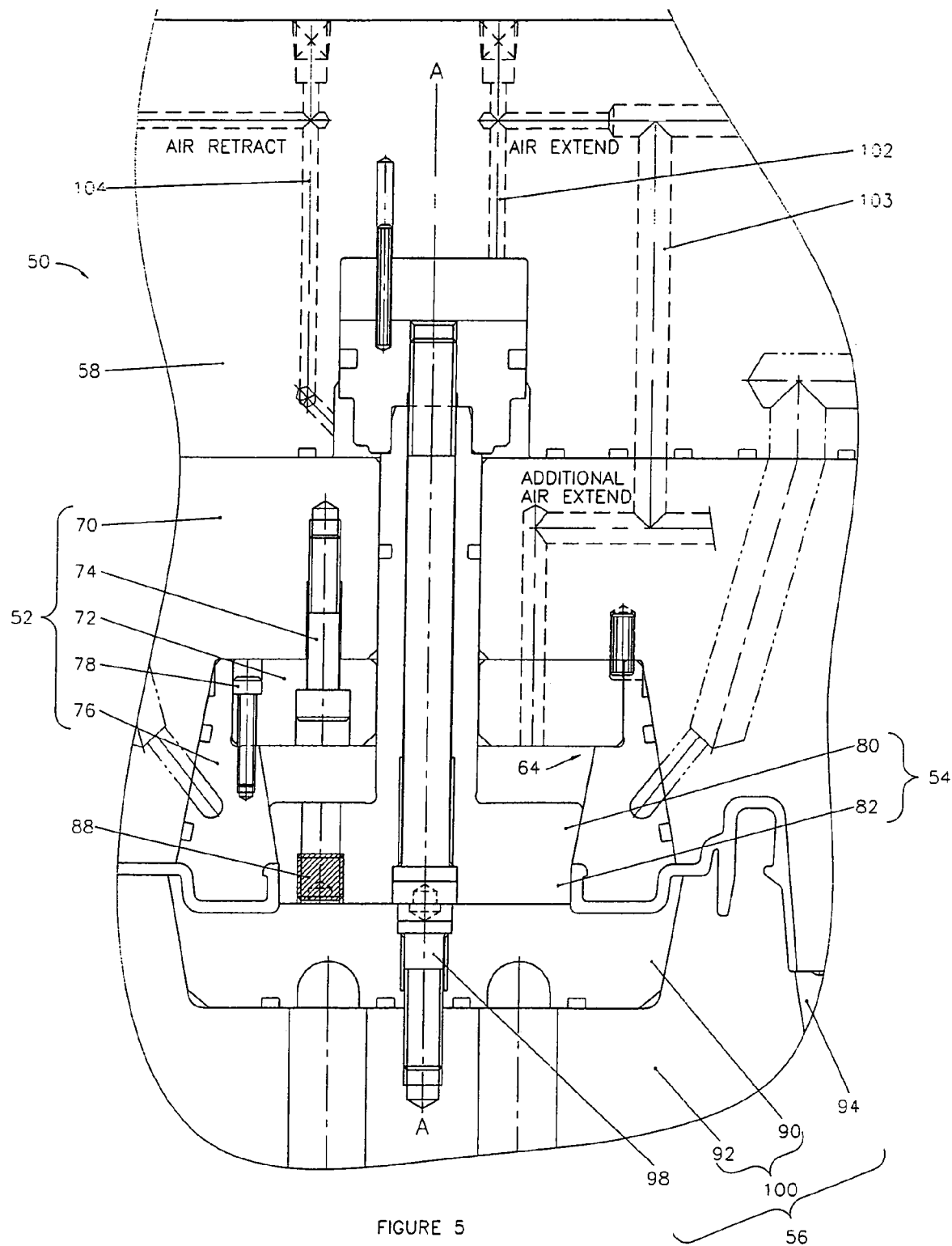
FIG. 5 is a half cross section view along a vertical plane through the centre of a mold according to a first preferred embodiment of the present invention, shown with the mold closed, and a second mold part shown at a molding position.
Figure 6:
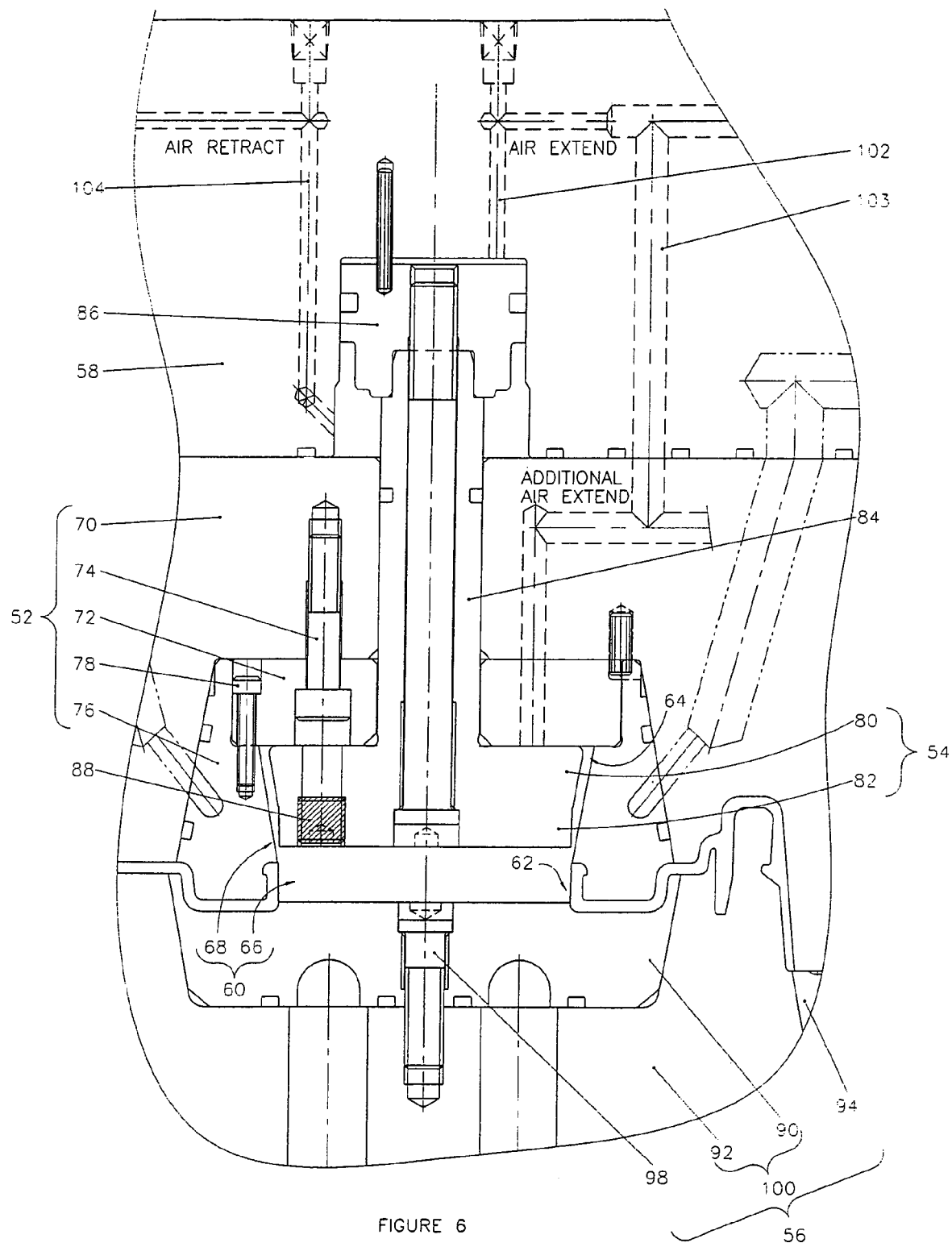
FIG. 6 is a view similar to FIG. 5, with the second mold part shown at a release position.
Figure 7:
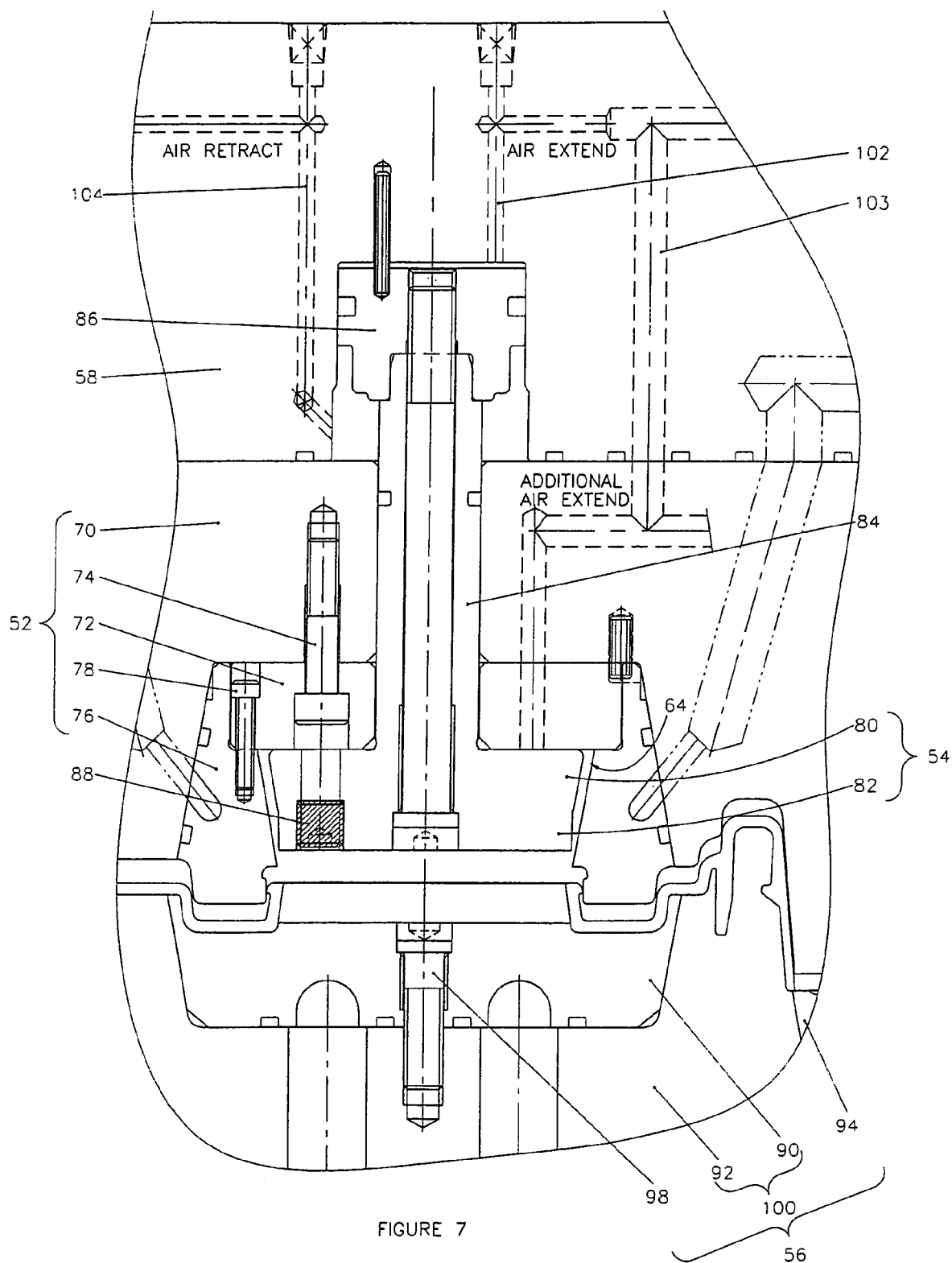
FIG. 7 is a view similar to FIG. 6, with the mold shown partially open.

With reference to FIGS. 5,6, the first mold part 52 is secured to a first backing plate 58 adapted for operative affixation to a respective one of the platens and defines a void 60. The void 60 has a front end 62, a rear end 64 and a central axis A—A extending therebetween, the central axis A—A being aligned in the direction of relative movement of the platens. At this point, it is noted that the terms "front" and "rear" are sometimes used in the mold-making arts to denote movement relative to the parting line; in this specification, "front" and "rear" should not be understood to embody this meaning.

The void 60 includes a cylindrical part-forming portion 66 and, rearwardly disposed therefrom, a frustoconical socket portion 68.

In this embodiment, the first mold part 52 will be seen to be constructed from a substrate plate 70, which is secured to the first backing plate 58 by screws (not shown), cavity subinsert 72 which is secured in the substrate plate 70 by screws 74, and a cavity insert 76, which is secured to cavity subinsert 72 by screws 78.

The second mold part 54 includes a frustoconical plug portion 80 and a protuberant cylindrical portion 82 extending frontwardly therefrom, and is operatively mounted to the first mold part 52 for movement between a molding position shown in FIG. 5 and a release position shown in FIG. 6. Such mounting is provided in this embodiment by a piston rod 84 which extends from the second mold part to a dual action piston formed by a cylinder formed in the first backing plate 58 and a piston 86 mounted therein.

At the molding position of the second mold part 54 shown in FIG. 5, the plug portion 80 is seated in the void 60, specifically, in the socket portion 68, and the protuberant portion 82 is disposed in the part-forming portion 66. At the release position of the second mold part 54, which is rearwardly disposed from the molding position and is shown in FIG. 6, the protuberant portion 82 is disposed rearwardly from the part-forming portion 66. The second mold part 54 will be seen to have threaded bores, in which set screws 88 are seated. The set screws 88 provide access to screws 74, which facilitates assembly/disassembly.

The third mold part 56 is a subassembly including a core insert 90, a core substrate plate 92 and a stripper ring 94. The core substrate plate 92 is secured to a second backing plate (not shown) adapted for operative affixation to the other of the platens, such that, upon relative movement of the platens, the core substrate plate 92 is movable between a molding position, shown in FIG. 5, frontwardly adjacent the first mold part 52, and a release position, shown in FIG. 8, frontwardly disposed relative to the molding position. The core insert 90 is secured by screw 98 to core substrate plate 92 for movement therewith between respective molding and release positions corresponding to the molding and release positions of the core substrate plate 92. The core insert 90 and core substrate plate 92 together form a base 100, which in turn has respective molding and release positions corresponding to those of its components.

The stripper ring 94 is nestable about the base as shown in FIG. 5, and, when so nested, is movable with the base 100 between molding and release positions corresponding to the same positions of the base 100. However, the stripper ring 94 is also mounted to the base 100 for relative movement in a manner which permits, when the base 100 is at its release position as shown in FIG. 8, movement of the stripper ring 94 between its release position, as shown in FIG. 8, and a rearwardly disposed stripping position shown in FIG. 9.

The third mold part 56 has a molding position, corresponding to the molding positions of each of the base 100 and the stripper ring 94, as illustrated in FIG. 5.

The first mold part 52, the second mold part 54 and the third mold part 56 have a molding configuration shown in FIG. 5 corresponding to the molding positions of the second mold part 54 and the third mold part 56 and in which the first mold part 52, the second mold part 54 and the third mold part 56 collectively define a mold cavity for the lid 20, with the protuberant portion 82 of the second mold part 54 defining the inner surface of the spout portion 30, the stripper ring 94 defining the frontward edge of the peripheral skirt 24; the first mold part 52 defining the outer surface of the peripheral skirt 24, the rearward side of the central planar portion 28, the rim portion 38 and the outer surface of the spout 30; and the base 100 defining the inner surface of the peripheral skirt 24, the frontward side of the central planar portion 28 and the locking flange 26.

Figure 8:
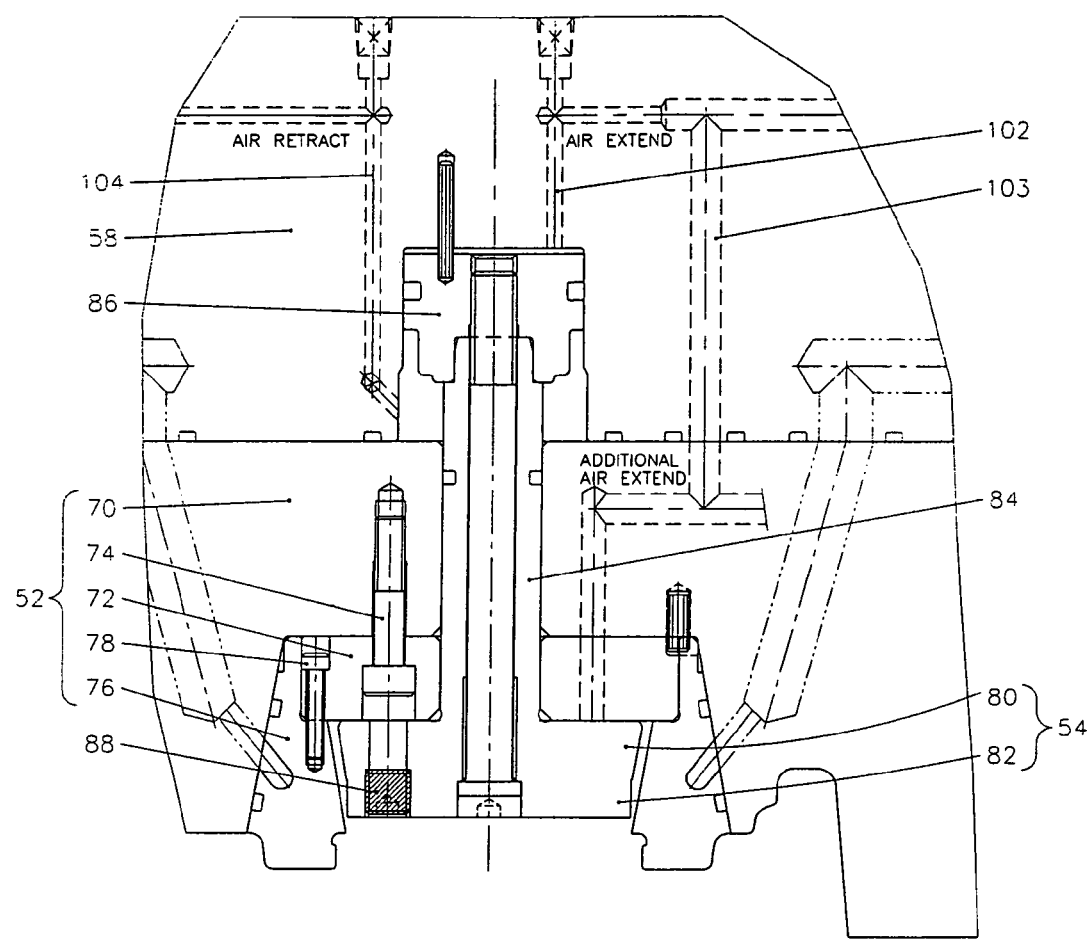
FIG. 8 is a view similar to FIG. 6, with the mold opened further.
Figure 8:
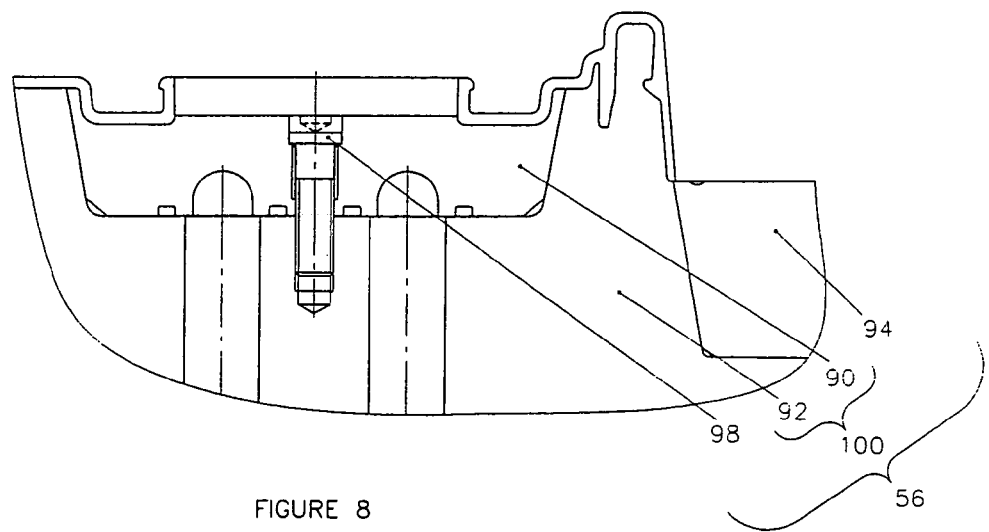
Figure 9:
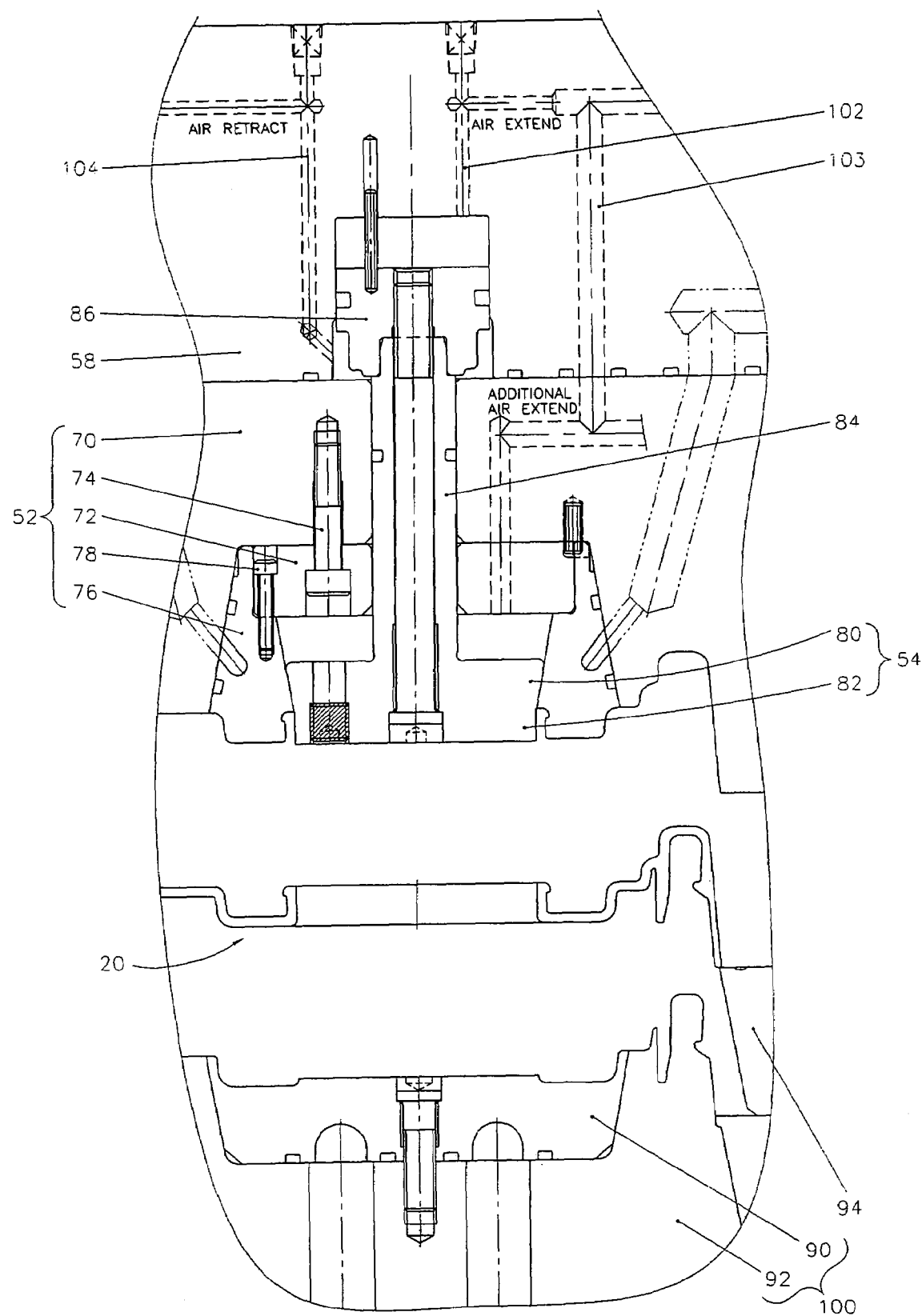
FIG. 9 is a view similar to FIG. 8, with the mold shown at a fully open position and a stripper ring shown at a stripping position.

The first mold part 52, the second mold part 54 and the third mold part 56 also have a release configuration, shown in FIG. 8, corresponding to the release positions of the second mold part 54 and the third mold part 56. In such configuration, a molded article can be pried from the mold 50. However, a preferred option for removal of the molded part is to move the stripper ring 94 to stripping position, which will eject the lid, as shown in FIG. 9.

With the first mold part 52, the second mold part 54 and the third mold part 56 in their molding configuration, to mold a part, molten plastic can be injected into the mold cavity through a sprue (not shown), and allowed to cool, to produce a molded article.

The molten plastic, being at relatively high pressure, will exert substantial force against the mold 50 until it has cooled and solidified. Accordingly, during such process, the platens will be held in fixed position to one another by the injection molding machine. As well, air pressure will be introduced through a first air passage 102 into the cylinder formed in the first backing plate 58 and through a second air passage 103 at the rear end 64 of void 60, so as to exert countering force against the rear of the piston 86 and the rear of the fructoconical plug portion 80.

After the article has solidified, the second mold part 54 can be moved from its molding position to its release position, by introduction of compressed air through a third air passage 104 in communication with the front of the piston 86. Subsequently, the third mold part 56 can be moved from its molding position to its release position, by relative movement of the platens. Thence, the stripper ring 94 can be moved from its release position to its stripping position, to eject the molded article from the base 100 as aforedescribed. The removal of the protuberant portion 82 away from the part forming portion 66 of the void provides ample clearance for the spout to flex inwardly during such ejection, so as to avoid distortion. Any of various mechanisms can be employed to effect movement of the stripper ring 94, such as pneumatic cylinders (not shown).

To repeat the cycle, the first mold part 52, second mold part 54 and third mold part 56 can be returned to their molding configuration by movement of the platens, movement of the stripper ring 94 and introduction of air into first air passage 102 and second air passage 103.

It will be understood that various modifications to the mold and process described above are possible.

Figure 10:
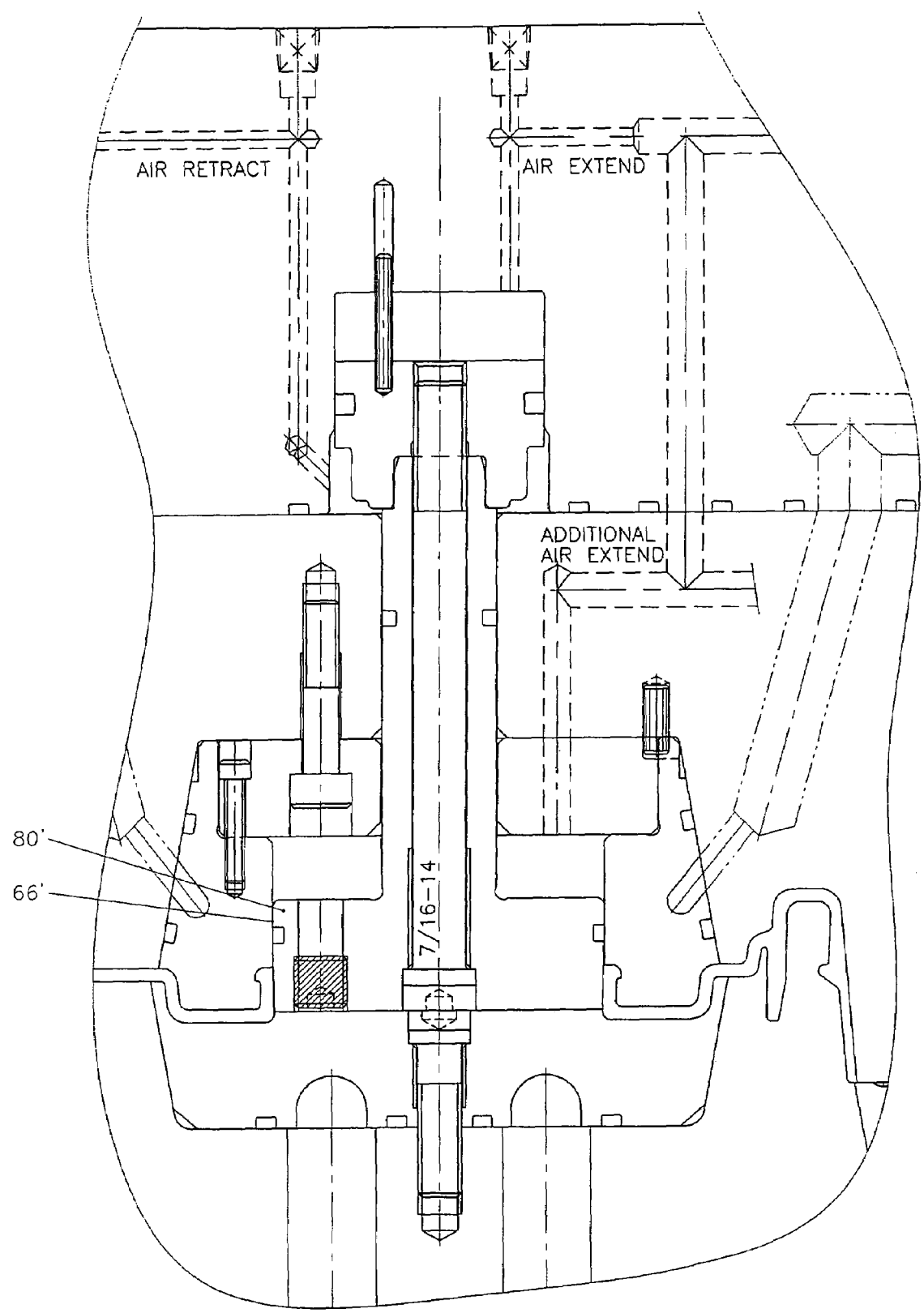
FIG. 10 is a half cross section view along a vertical plane through the centre of a mold according to a second preferred embodiment of the present invention, shown with the mold closed, and a second mold part shown at a molding position.

For example, whereas the socket and plug portion are shown in FIGS. 5–9 as being frustoconical, other cross-sections are possible. For example, cylindrical sockets 68' and plugs 80' can be provided, as shown in FIG. 10. More careful machining is required for this embodiment, to inter alia, avoid flashes, but it otherwise functions with similar utility to the embodiment illustrated in FIGS. 5–9.

Figure 11:
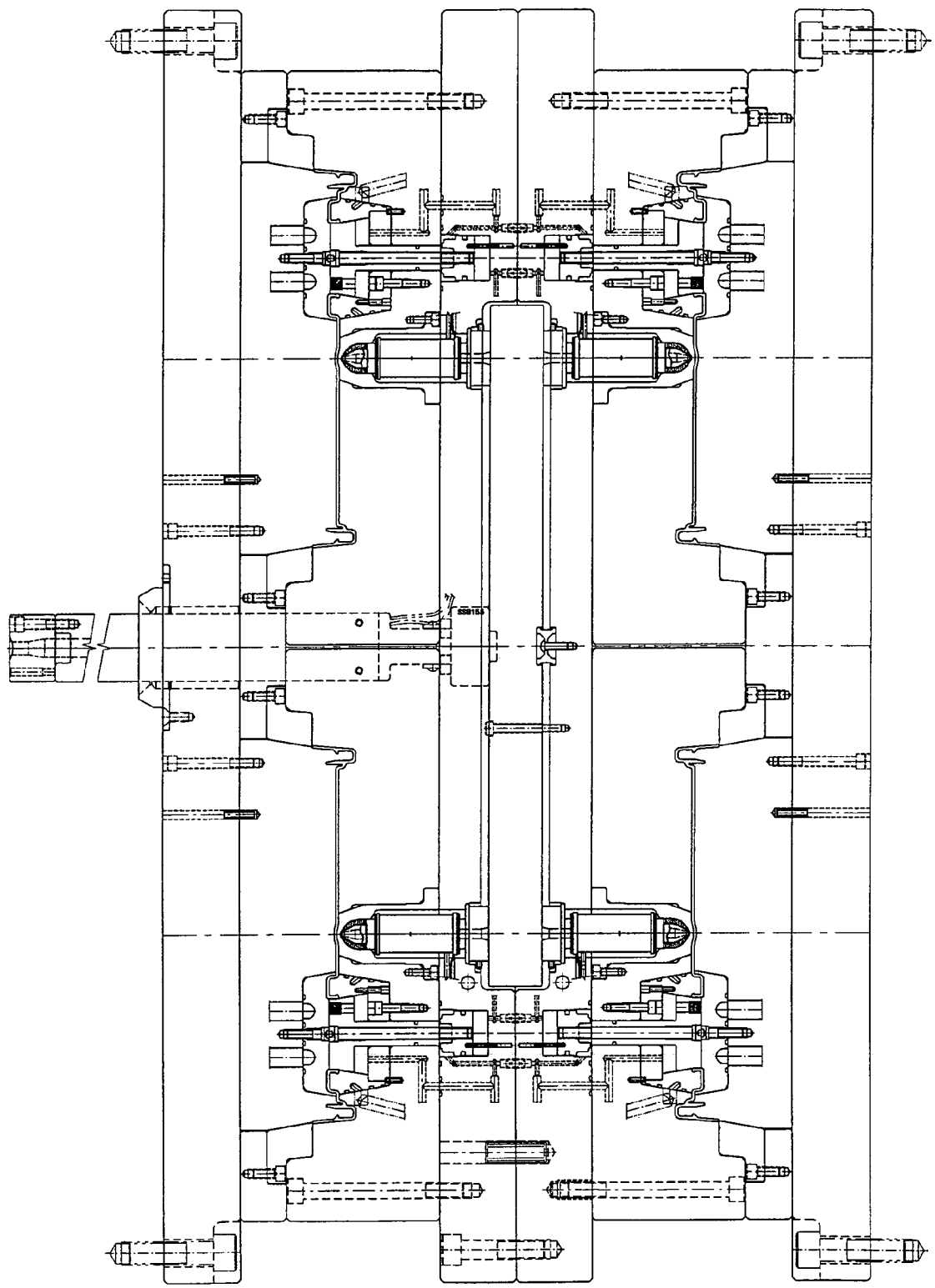
FIG. 11 is a cross section view taken along a vertical plane through the mold centre of a stack mold constructed according to the first preferred embodiment, and having back-to-back positioning of the molds therein.

As well, whereas the mold of FIGS. 5–9 is intended for use in a single face lid mold, the invention can be practised in a stack mold. For example, a pair of injection molds can be employed, as shown in FIG. 11, wherein the first mold parts of the injection molds are operatively rigidly secured to one another, and wherein the third mold parts of the injection molds are respectively adapted for affixation to respective platens in an injection molding machine, to provide for said relative movement of the third mold parts between their molding and release positions. This arrangement provides for back-to-back positioning of the molds therein, which provides for advantageous efficiency in terms of space.

Figure 12:
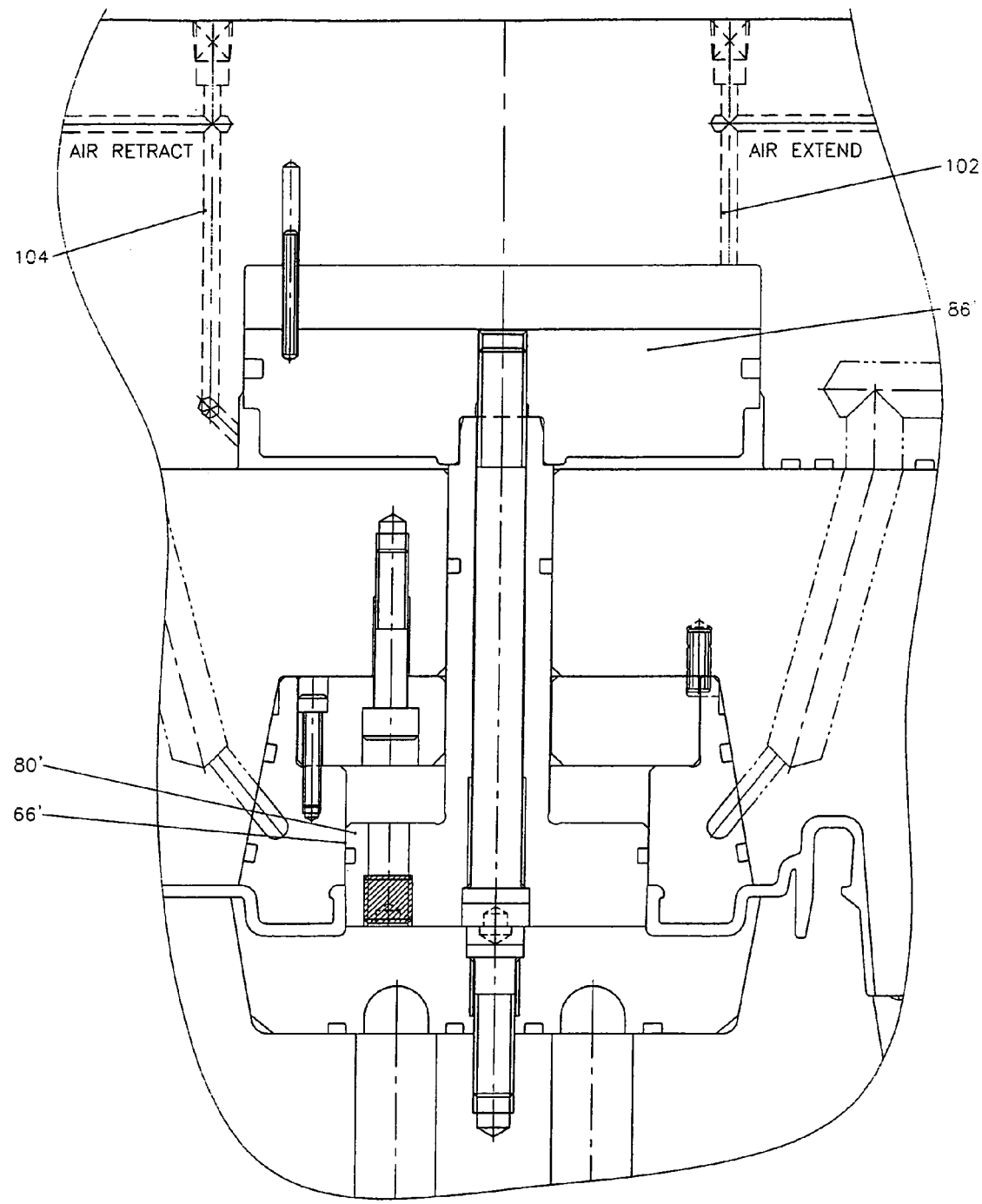
FIG. 12 is a half cross section view along a vertical plane through the centre of a mold according to a third preferred embodiment of the present invention, shown with the mold closed, and a second mold part shown at a molding position.
Figure 13:
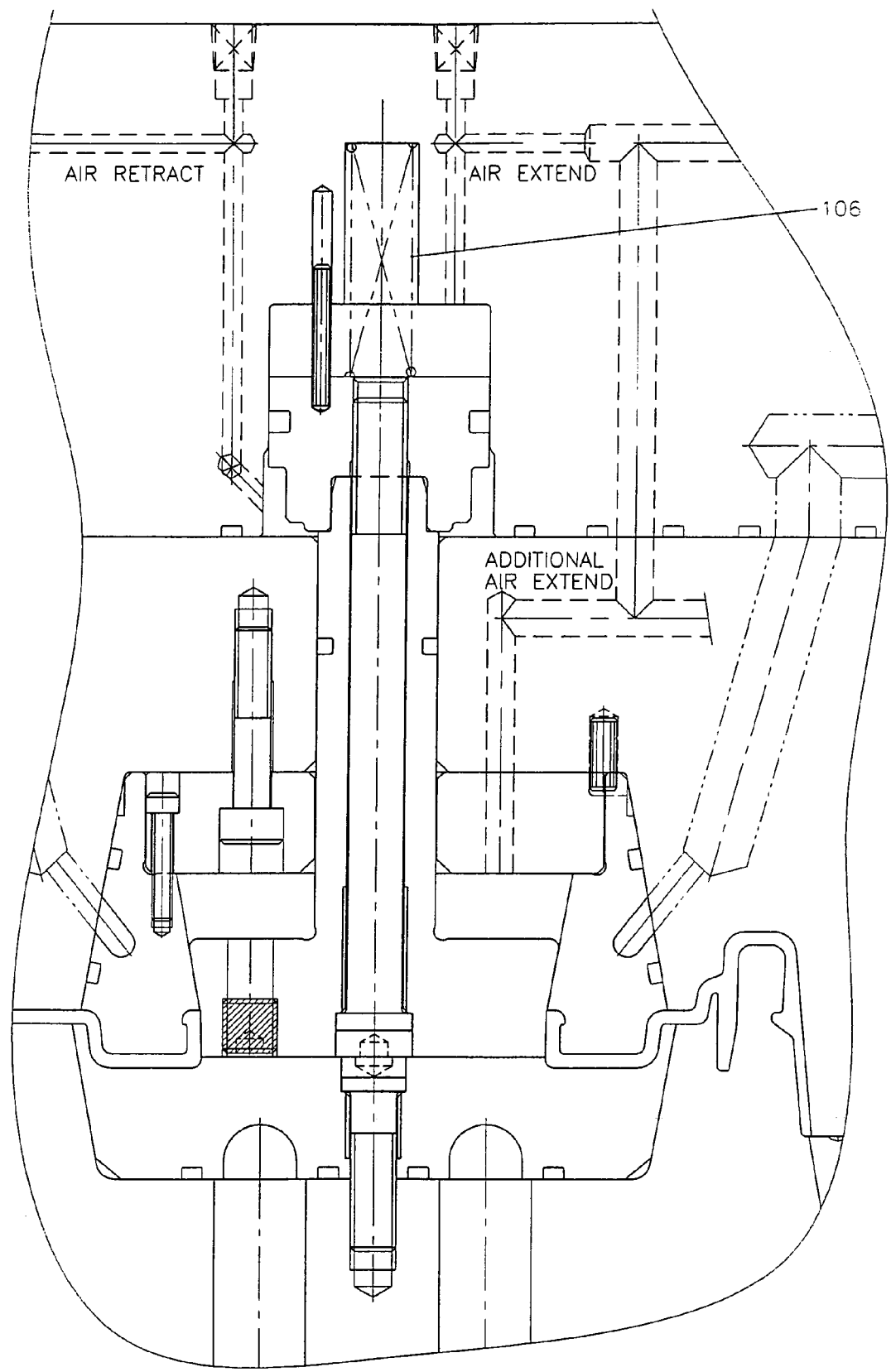
FIG. 13 is a view similar to FIG. 5 showing a fourth preferred embodiment of the present invention.

Additionally, whereas the mold of FIGS. 5–9 relies solely upon pneumatic pressure in a compound piston arrangement to maintain the second mold part 54 at its molding position (air pressure acts on both piston 86 and plug portion 80 in FIGS. 5–9) other configurations are possible. Compound pistons can be avoided, for example, by providing an oversized piston 86', as shown in FIG. 12. Also, pneumatic pressure can be supplemented with a spring 106, as shown in FIG. 13.

Figure 14A:
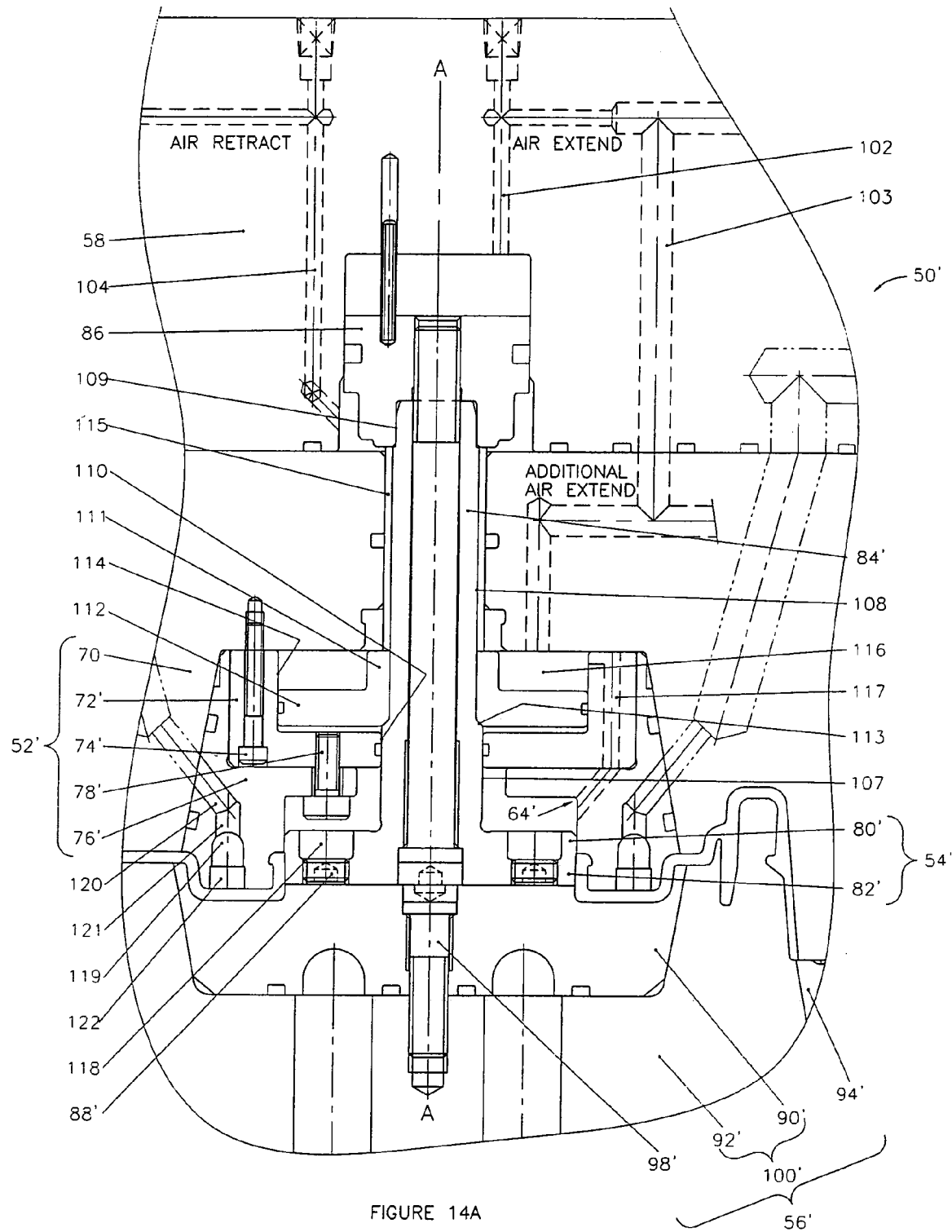
FIG. 14A is a half cross section view along a vertical plane through the center of a mold according to a fifth preferred embodiment of the present invention, shown with the mold closed, and a second mold part shown at a molding position.
Figure 14B:
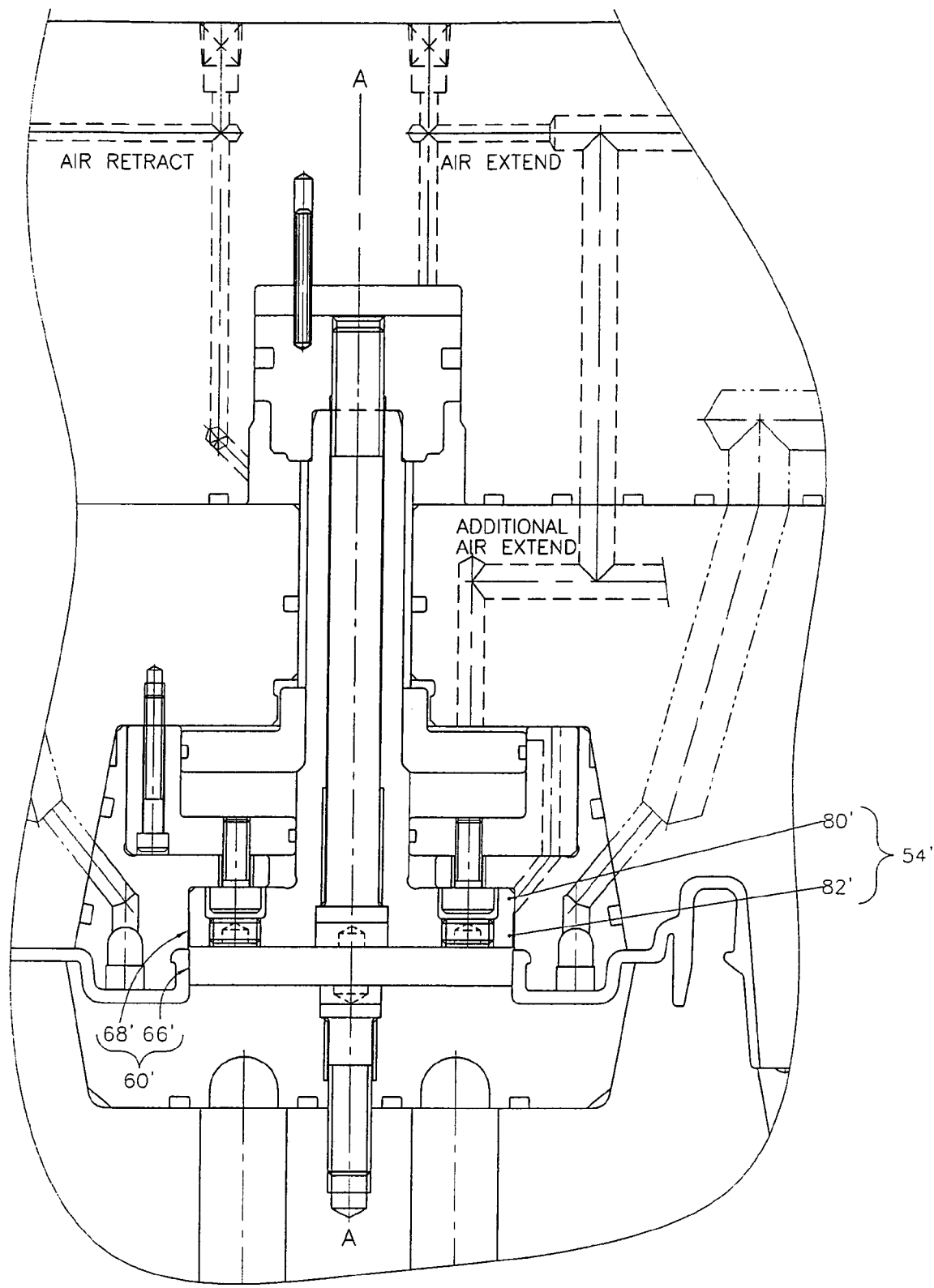
FIG. 14B is a view similar to FIG. 14A, with the second mold part shown at a release position.

FIGS. 14A and 14B present yet another embodiment, which uses a triple piston arrangement. In this embodiment, a first mold part 52' is constructed from a substrate plate 70, which is secured to the first backing plate 58 by screws (not shown), cavity subinsert 72' which is secured in the substrate plate 70 by screws 74', and a cavity insert 76', which is secured to cavity subinsert 72' by screws 78'.

A second mold part 54' of this embodiment includes a cylindrical plug portion 80' and a protuberant cylindrical (or slightly frustoconical) portion 82' extending frontwardly therefrom, and is operatively mounted to the first mold part 52' for movement between a molding position shown in FIG. 14A and a release position shown in FIG. 14B. Such mounting is provided in this embodiment by a piston rod 84', which extends from the second mold part 54' to a piston 86 mounted in a cylinder formed in the first backing plate 58. At the molding position of the second mold part 54' shown in FIG. 14A, the plug portion 80' is seated in the void 60', specifically in the socket portion 68', and the protuberant portion 82' is disposed in the part-forming portion 66'. At the release position of the second mold part 54', which is rearwardly disposed from the molding position and is shown in FIG. 14B, the protuberant portion 82' is disposed rearwardly from the part-forming portion 66'. The second mold part 54' will be seen to have threaded bores, in which set screws 88' are seated. The set screws 88' provide access to screws 78', which facilitates assembly/disassembly.

Removal of cavity subinsert 72' will be possible only after cavity insert 76' has been removed and screws 78' become accessible.

Piston rod 84' of this embodiment has three cylindrical portions: a first portion 107, located behind plug portion 80', a second portion 108, of reduced diameter, located behind portion 107, and a third portion 109, of further reduced diameter, located behind portion 108. The first cylindrical portion 107 is guided by a first bore 110 defined in cavity subinsert 72', when second mold part is moving between molding and release positions. A cylindrical sleeve 111, having a flanged portion 112, is fixedly located onto portion 108, being backed by the shoulder 113 created between the first portion 107 and the second portion 108. Flanged portion 112 is guided by a second inner bore 114 defined by cavity subinsert 72', when second mold part is moving between molding and release positions. The third portion 109 is fitted in a front pocket of piston 86. A spacer 115, centered onto cylindrical portion 108 and in contact with the front surface of piston 86, is used to prevent cylindrical sleeve 111 from breaking contact with shoulder 113.

A third mold part 56, similar to that of FIG. 5, is also provided and is not described here in further detail.

When it is necessary to bring the second mold part 54' in the molding position, air is introduced through a first air passage 102 into the cylinder formed in the first backing plate 58, through a second air passage 103 into a void 116 formed in cavity subinsert 72', behind flanged portion 112, and also through a fourth air passage 117 to rear end 64' of void 60'. What this design achieves is an increased force output, not by increasing the diameter of the cylinder bores, but by increasing the number of pressurized surfaces, and hence an increased pressurized area. Specifically, air introduced through air passage 102 acts on the back of piston 86; air introduced through passage 103 acts on the back of flanged end 112 of cylindrical sleeve 111; and introduced through passage 117 acts on the back of plug portion 80' of the second mold part, to move the second mold part 54' to and hold it at its molding position, as shown in FIG. 14A. This arrangement is useful for situations where diametral space is limited, such as in this embodiment, wherein proximity of the crimp-on opening to the periphery of the lid, on one side, and to the hot runner system/gate insert, on the opposite side, limits the diametral extension of the spout design.

When it is necessary to move the second mold part 54' to its release position, compressed air will be introduced through air passage 104 in communication with the front of the piston 86.

It should be noted that plug portion 80' in this embodiment is provided with an annular groove, or local bores 118 behind set screws 88', sufficiently wide to allow clearance for heads of screws 78' when the second mold part 54' is in its release position.

Also of note, in this embodiment, a frontwardly-opening annular groove 119 is provided on the front surface of the cavity insert 76', which connects to side holes 120 through front holes 121. The groove 119 has a front portion and a contiguous annular rear portion. An annular ring insert 122 is fixedly secured in space-filling relation in the front portion of groove 119 by some reliable means, such as metal fusing, to seal the mold cavity for the lid 20 from the cooling groove 119. The rear portion of the groove 119 defines an annular portion of a cooling passage which is disposed in surrounding, spaced proximal relation to that part of the mold cavity which defines the spout in use. This provides advantageous cooling properties, which could result in improved cycle time relative to the prior art, wherein cooling of cavity inserts is typically done by an annular groove in the place of holes 120, such groove being sloped towards the molding area similar to holes 120, as shown for example in FIG. 6.

Figure 15:
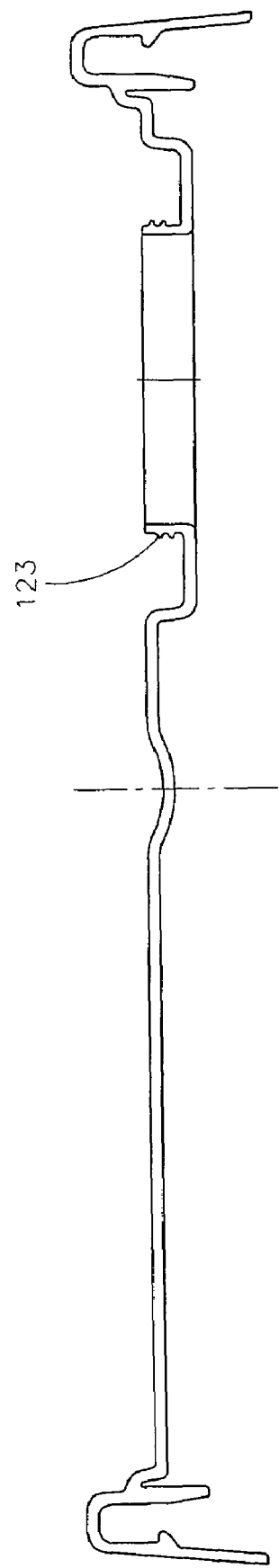
FIG. 15 is a cross section view along a vertical plane through the center of a lid of the prior art, having a spout with outer thread.
Figure 16A:
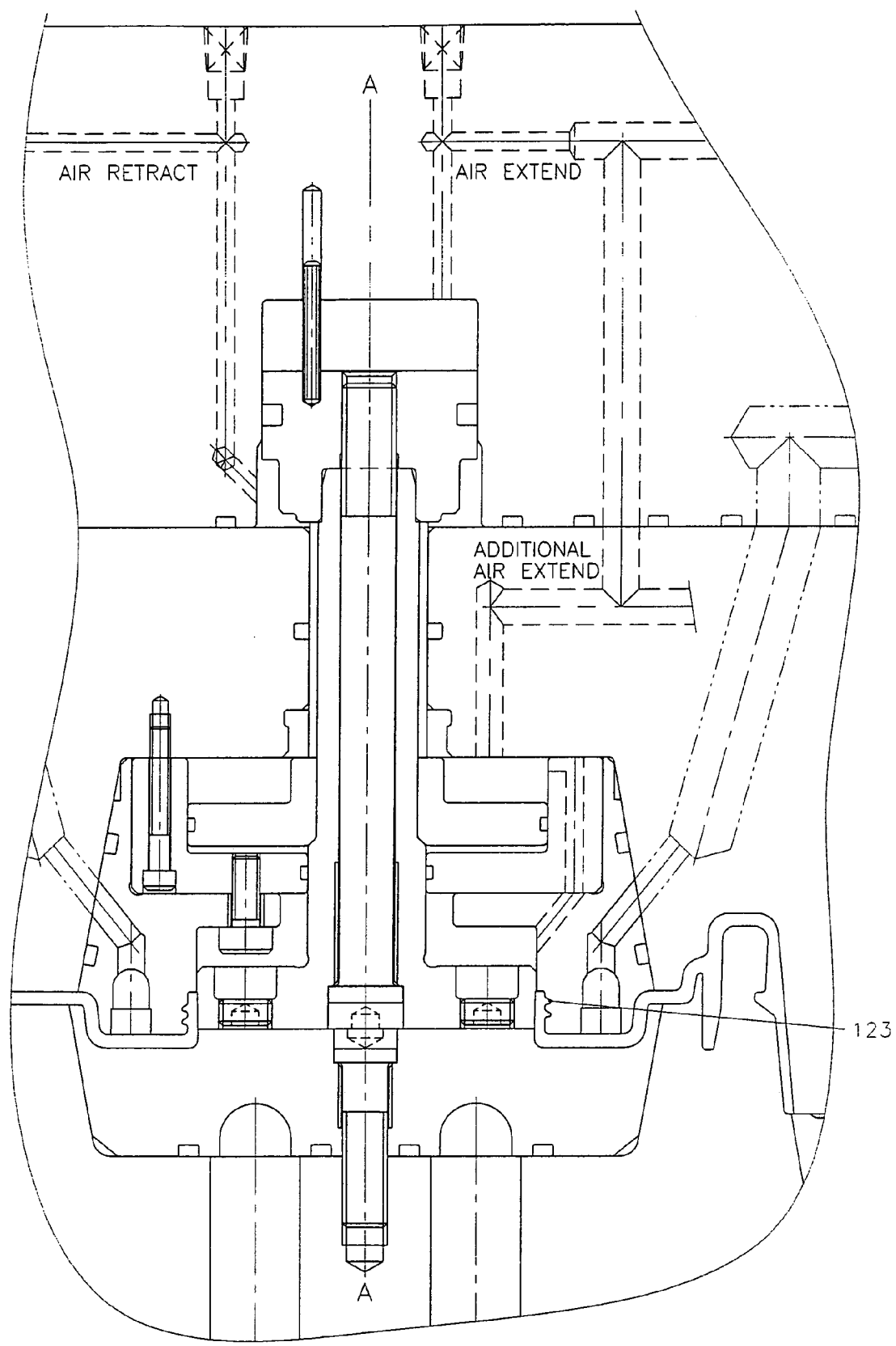
FIG. 16A is a half cross section view along a vertical plane through the center of a mold according to a sixth preferred embodiment of the present invention, for molding a lid with threaded spout, shown with the mold closed, and a second mold part shown at a molding position.
Figure 16B:
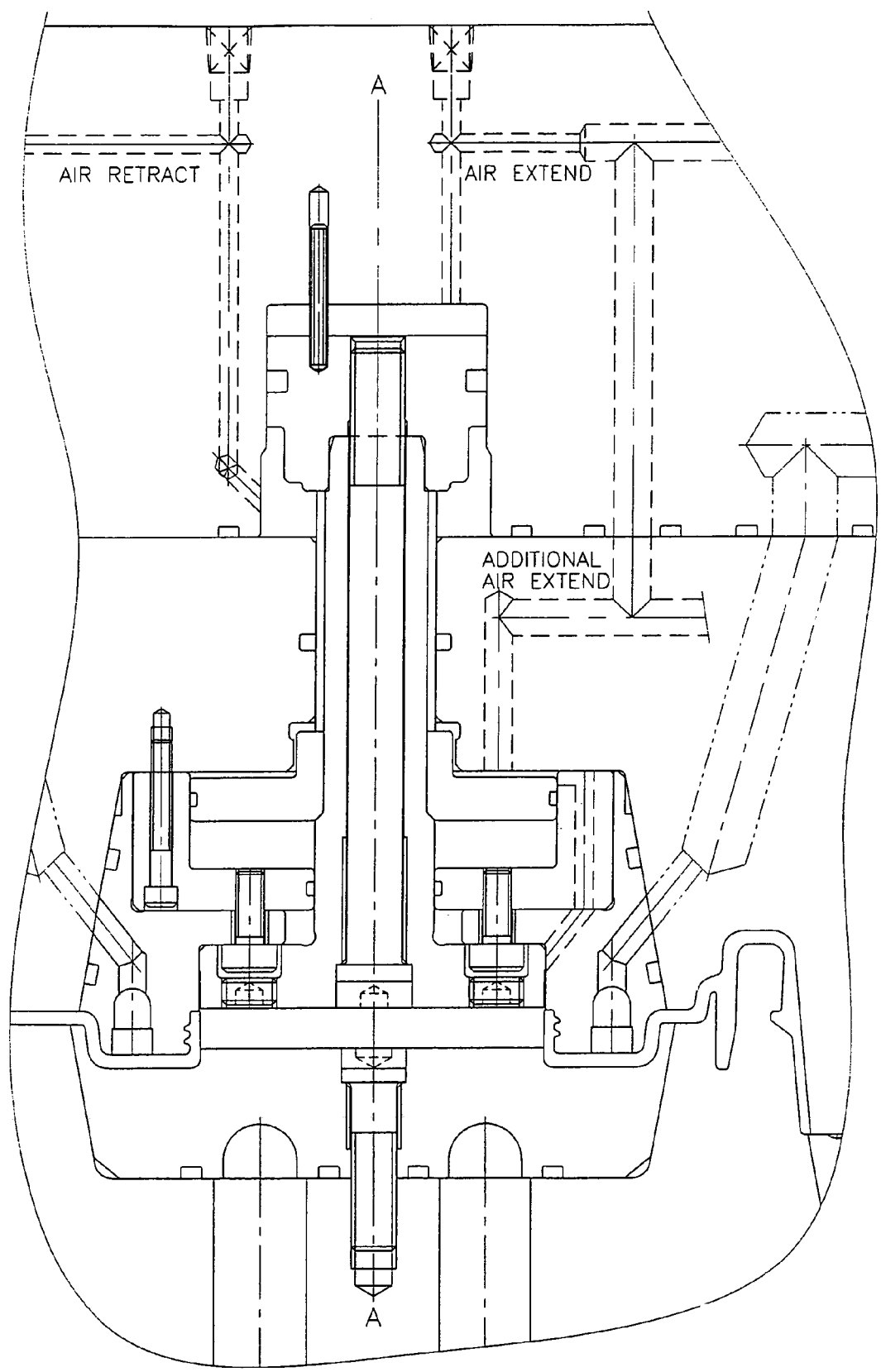
FIG. 16B is a view similar to FIG. 16A, with the second mold part shown at a release position.

FIG. 15 shows an example of a lid having a threaded spout. Such lids, having outer threads, are known in the art, and usually require the use of collets for release without distortion. FIGS. 16A, 16B show the embodiment of FIGS. 14A and 14B adapted to produce the lid of FIG. 15. FIG. 16A shows a detail of the threaded spout portion of the lid in the mold, with the second and third mold parts in their respective molding positions. FIG. 16B shows the same embodiment, but with the second mold part is at its release position, thus leaving the spout opening free to flex for release of the first mold part, when the third mold part moves to its release position. The underside of the threads is designed slightly sloped and corners are rounded to help release the first mold part without causing distortion damage to the threads.

Yet further modifications are possible.

For example, whereas the first mold parts of the preferred embodiments are constructed using a substrate plate, a cavity subinsert and a cavity insert, held together by screws and located by positioning dowels, this is a matter of manufacturing convenience, only; greater or less number of components may be so employed.

Greater or lesser number of components could similarly be employed in the construction of the third mold part.

Respecting the second mold part, whereas the protuberant portion of the first preferred embodiment is cylindrical, other cross-sections, for example, elliptical, could be employed. As well, whereas the plug portion of the second mold part is frustoconical, to match the socket, in FIGS. 5–9, both components could take different forms with equal utility, including but not limited to the cylindrical form of FIG. 10.

Additionally, a separable stripper ring need not be employed.

Yet further, whereas the mold of the present invention is taught to be useful with molten plastics, other hardenable substances, such as reactive mixtures, or substances curable with radiation, could be employed therewith.

Moreover, whereas the mold of the preferred embodiments shown produce specific lids, the shape, size and design of the lids can be widely modified, and indeed, the invention is not limited to lids.

Accordingly, it should be understood that the scope of the present invention is to be limited only by the claims appended hereto, purposively construed.

What is claimed is:

1. An injection mold comprising:
a first mold part defining a void having a front end, a rear end and a central axis extending therebetween, the void including a part-forming portion and, rearwardly disposed therefrom, a socket portion;
a second mold part including a plug portion and a protuberant portion, the second mold part having a molding position whereat the plug portion is seated in the socket portion and the protuberant portion is disposed in the part-forming portion, and being rearwardly movable therefrom relative to the first mold part to a respective release position whereat the protuberant portion is disposed rearwardly from the part-forming portion;
a third mold part having a molding position frontwardly adjacent the first mold part and being frontwardly movable therefrom relative to the first mold part to a respective release position,
the first mold part, the second mold part and the third mold part having
a molding configuration corresponding to the molding positions of the second mold part and the third mold part and in which the first mold part,
the second mold part and the third mold part collectively define a mold cavity for an article having a main body portion, a tubular spout portion and an annular rim portion, the main body portion defining an aperture, the spout portion having one end in communication with the aperture and rearwardly extending therefrom to a distal end and the rim portion ringing the distal end of the spout portion,
a release configuration corresponding to the release positions of the second mold part and the third mold part and which permits the removal of a molded article from the mold,
wherein the protuberant portion defines the inner surface of the spout portion and extends frontwardly from the plug portion.

2. An injection mold according to claim 1, wherein the article is a lid for a container and wherein the main body portion includes a central planar portion in which the aperture is defined, a frontwardly depending annular peripheral skirt and an inwardly disposed locking flange which circumscribes the interior of the skirt.

3. An injection mold according to claim 2, wherein
the third mold part is a subassembly including a base and a stripper ring, each having a molding position and a release position corresponding to the molding and release positions of the third mold part, and
the stripper ring defines at least a portion of the frontward edge of the peripheral skirt; the first mold part defines the outer surface of the peripheral skirt, the rearward side of the central planar portion, the rim portion and the outer surface of the spout; and the base defines the inner surface of the peripheral skirt, the frontward side of the central planar portion and the locking flange.

4. An injection mold according to claim 3, wherein, when the second mold part is at its release position and the base is at its release position, the stripper ring is movable between its release position and a rearwardly disposed stripping position, to eject a molded part seated on the base from the mold.

5. An injection mold according to claim 4, wherein the stripper ring is operatively mounted to the base part for said movement between its stripping and release positions.

6. An injection mold according to claim 5, wherein the second mold part is operatively mounted to the first mold part for movement between its molding and release positions.

7. An injection mold according to claim 6, wherein the first mold part and the base part are respectively adapted for affixation to respective platens in an injection molding machine, to provide for said relative movement of the third mold part between its molding and release positions.

8. An injection mold according to claim 7, further comprising pneumatic means for selectively moving the second mold part between its molding and release positions and holding said second mold part at its molding position.

9. An injection mold according to claim 8, wherein the pneumatic means comprises a dual action piston and a piston rod rigidly extending between the dual action piston and the second mold part.

10. An injection mold according to claim 9, wherein the second mold part and the void define, respectively, the piston and the cylinder of a first single action piston for urging the second mold part to its molding position and holding said second mold part at its molding position.

11. An injection mold according to claim 9, wherein the first mold part defines a bore and further comprising a flanged portion rigidly mounted to the piston rod, the bore and the flanged portion defining, respectively, the cylinder and the piston of a second single action piston for urging the second mold part to its molding position and holding said second mold part at its molding position.

12. An injection mold according to claim 1, wherein the first mold part defines a cooling passage for receiving a flow of coolant, the cooling passage including an annular portion, the annular portion being disposed in surrounding, spaced, proximal relation to that part of the mold cavity which defines the spout in use.

13. An injection mold according to claim 12, further comprising an annular ring, wherein a front face of the first mold part has a frontwardly-opening annular groove defined therein, said groove having an annular front portion and a contiguous annular rear portion, the rear portion defining the annular portion of the cooling passage, and wherein the annular ring is fitted in space-filling relation to the front portion and secured to the first mold part.

14. An injection mold according to claim 13, wherein the annular ring and the first mold part are made of metal, and are fused to one another.

15. A stack mold comprising:
a pair of injection molds, each injection mold including:
a first mold part defining a void having a front end, a rear end and a central axis extending therebetween, the void including a part-forming portion and, rearwardly disposed therefrom, a socket portion;
a second mold part including a plug portion and a protuberant portion, the second mold part having a molding position whereat the plug portion is seated in the socket portion and the protuberant portion is disposed in the part-forming portion, and being rearwardly movable therefrom relative to the first mold part to a respective release position whereat the protuberant portion is disposed rearwardly from the part-forming portion;
a third mold part having a molding position frontwardly adjacent the first mold part and being frontwardly movable therefrom relative to the first mold part to a respective release position,
the first mold part, the second mold part and the third mold part having a molding configuration corresponding to the molding positions of the second mold part and the third mold part and in which the first mold part, the second mold part and the third mold part collectively define a mold cavity for an article having a main body portion, a tubular spout portion and an annular rim portion, the main body portion defining an aperture, the spout portion having one end in communication with the aperture and rearwardly extending therefrom to a distal end and the rim portion ringing the distal end of the spout portion, and a release configuration corresponding to the release positions of the second mold part and the third mold part and which permits the removal of a molded article from the mold, wherein:

the protuberant portion defines the inner surface of the spout portion and extends frontwardly from the plug portion, the first mold parts of the injection molds are operatively rigidly secured to one another, and the third mold parts of the injection molds are respectively adapted for affixation to respective platens in an injection molding machine, to provide for said relative movement of the third mold parts between their molding and release positions.

16. An injection mold for molding an article having a main body portion, a tubular spout portion and an annular rim portion, the main body portion defining an aperture, the spout portion having one end communicating with the aperture and extending therefrom to a distal end and the rim portion ringing the distal end of the spout portion, said mold comprising:

a first mold part defining a void having a front end, a rear end and a central axis extending therebetween;

a second mold part having a molding position whereat it is seated in the void and being rearwardly movable therefrom relative to the first mold part to a respective release position;

a third mold part having a molding position frontwardly adjacent the first mold part and being frontwardly movable therefrom relative to the first mold part to a respective release position, the first mold part, the second mold part and the third mold part having a molding configuration corresponding to the molding positions of the second mold part and the third mold part and in which the first mold part, the second mold part and the third mold part collectively define a mold cavity for said article, a release configuration corresponding to the release positions of the second mold part and the third mold part, in which configuration the mold permits the removal of a molded article, wherein the cavity is orientated such that, in a molded article produced therein in use, the spout projects rearwardly, and wherein the second mold part defines the inner surface of the spout portion.

17. An injection mold according to claim 16, wherein the third mold part is a subassembly including a base and a stripper ring, each having a molding position and a release position corresponding to the molding and release positions of the third mold part, and the stripper ring defines at least a portion of the frontward edge of the peripheral skirt; the first mold part defines the outer surface of the peripheral skirt, the rearward side of the central planar portion, the rim portion and the outer surface of the spout; and the base defines the inner surface of the peripheral skirt, the frontward side of the central planar portion and the locking flange.

18. An injection mold according to claim 17, wherein, when the second mold part is at its release position and the base is at its release position, the stripper ring is movable between its release position and a rearwardly disposed stripping position, to eject a molded part seated on the base from the mold.

* * * * *